Patented Feb. 24, 1953

2,629,713

UNITED STATES PATENT OFFICE 2,629,713

HETEROGENEOUS, ACIDIC HYDROLYSIS OF POLYMERIC ESTERS

Max T. Goebel, Rocky River, Ohio, assignor to E. I. du Pont de Nemours & Company, Wilmington, Del., a corporation of Delaware No Drawing. Application April 18, 1947, Serial No. 742,466

12 Claims. (Cl. 260—91.3)

This invention relates to the hydrolysis of polymeric esters and more particularly to the heterogeneous hydrolysis, in aqueous, acidic medium, of water-insoluble esters of polymeric hydroxy compounds.

Previously known methods of hydrolyzing water-insoluble polymeric esters have been limited because of certain, inherent disadvantages. For example, the homogeneous hydrolysis of polyvinyl acetate in alcoholic solutions of a sodium alkoxide yields a polyvinyl alcohol of high ash content and a monomeric ester which is normally not readily recoverable for commercial purposes. This latter difficulty is also encountered in the acidic hydrolysis of polyvinyl acetate in its alcoholic solutions. Aqueous hydrolysis of polyvinyl acetate in its acetic acid solutions requires the recovery of large quantities of acetic acid, the amount being usually in the range of 9 to 10 pounds of acetic acid per pound of the polymer produced. Likewise, in the hydrolysis of cellulose triacetate in acetic acid solution, approximately 6.5 pounds of acetic acid must be recovered for each pound of cellulose acetate produced. Hydrolysis of polyvinyl acetate in aqueous hydrochloric acid is an extermely slow reaction. Accordingly, it is economically desirable to hydrolyze polymeric esters in such a way that the acid residue from the polymeric ester is obtained as the free acid or in salt form rather than as a corresponding ester and that the amount of solvent to be recovered, the amount of catalyst needed, and the total time required are minimized.

This invention has as an object the hydrolysis of water-insoluble, polymeric esters by a process whereby the above mentioned difficulties are avoided. A further object is the provision of a process for the heterogeneous hydrolysis of water-insoluble polymeric esters. A still further object is the hydrolysis, in aqueous media containing organic acids, of water-insoluble organic esters, such as polyvinyl esters and cellulose esters. Other objects will appear hereinafter.

The objects are accomplished by the following invention which water-insoluble polymeric esters are hydrolyzed by heating them in aqueous media containing a strong acid such as a sulfonic, a phosphinic, or a phosphonic acid, said acids being appreciably soluble in the polymeric ester being hydrolyzed.

In order to accomplish the desired hydrolysis the acid must be a strong acid and must be appreciably soluble in the ester being hydrolyzed. It has been found that sulfonic, phosphinic and phosphonic acids containing at least five carbon atoms in an alkyl chain or in an aromatic group meet these requirements. For most effective hydrolysis the aqueous, acidic medium should have a pH of less than 2.0 and a surface tension of less than 60 dynes per centimeter.

The following examples, wherein parts are by weight, are given by way of illustration and are not to be considered as limitative.

Example I

To 100 parts of water were added 2 parts of concentrated sulfuric acid and one part of Nacconol NR (40–45% sodium dodecylbenzene sulfonate), the other ingredients being sodium sulfate and water. Twenty five parts of polyvinyl acetate (sold commercially as RH-837) in bead form was added. The reaction mixture had a pH of less than 1.5 and a surface tension of 33 dynes per centimeter. After stirring the initially heterogeneous reaction mixture for 22 hours on the steam bath, a clear solution was obtained, indicating the production of a water-soluble polyvinyl alcohol. The product could be isolated in powder form by any of the usual methods, such as precipitation. Alternatively, the acids could be destroyed by addition of a base and the water could be removed by distillation, leaving a solid product which could be further purified readily by washing techniques. After drying, it was found to be readily dispersible in water. The degree of hydrolysis was about 95%.

Example II

Thirty parts of polyvinyl acetate (RH-838), 200 parts of water, four parts of oxalic acid and 0.075 part of sodium dodecyl benzene sulfonate were heated with stirring at 95° C. The polymeric ester used differs from that employed in Example I in that it has a higher degree of polymerization. The pH of the reaction mixture was 1.3 and its surface tension was 33.5 dynes per centimeter. After 20 hours of heating a homogeneous solution resulted. The product was a water-dispersible polyvinyl alcohol and, as in Example I, the degree of hydrolysis was found to be about 95%.

Example III

A reaction mixture was made up composed of the following ingredients: 30 parts of cellulose triacetate, 100 parts of 1% aqueous sulfuric acid and 0.1 part of Nacconal NRSF (sodium dodecyl benzene sulfonate containing about 20% sodium sulfate). The surface tension of the reaction medium was 33 dynes per centimeter and the pH was less than 1.5. After heating the reaction mixture with stirring for 21 hours at 90° C. to 95° C., a secondary cellulose acetate was obtained which contained 32.5% combined acetic acid. In a similar run but in the absence of the sulfonate, the secondary ester was hydrolyzed only to a slight degree, the final product containing 58.25% combined acetic acid.

*Example IV*

A reaction mixture having the desired pH of less than 1.5 and the desired surface tension of 38 dynes per centimeter resulted upon mixing 73 parts polyvinyl acetate (RH-838), 40 parts of glacial acetic acid, 18 parts of 10% sulfuric acid and 0.42 part of sodium dodecyl benzene sulfonate in 123.8 parts of water. Heating at 90° C. to 95° C. with stirring for four hours led to a homogeneous reaction mixture. The hydrolysis treatment was continued for an additional 12 hours. The polyvinyl acetate had been hydrolyzed to an extent of about 85%; that is, the polyvinyl alcohol contained about 15-mole per cent of vinyl acetate.

In the heterogeneous hydrolysis of water-insoluble polymeric esters by the process of this invention it is necessary that the catalysts used be appreciably soluble in the polymeric esters subjected to hydrolysis and sufficiently acidic to promote the desired hydrolysis. The acid should not, however, be completely ionized, since the water-insoluble polymeric esters are not readily permeated by ions. Satisfactory results are obtained when the hydrolysis medium has a pH of less than 2.0 and a surface tension of less than 60 dynes per centimeter. Generally, if the resultant reaction medium has a pH above 2 the rate of reaction is too slow. For example, when 1% of octenyl phosphonic acid is used, the reaction mixture has a pH slightly above 2 and a surface tension of 32 dynes/cm. and 120 hours are required for hydrolysis of polyvinyl acetate. However, the hydrolysis of the ester under comparable conditions using dodecyl benzene sulfonic acid is accomplished in 6 to 8 hours, the reaction medium having a pH of 1.4 and a surface tension of 32 dynes/cm. The surface tension is indicative of the relative solubility of the catalyst acid in water and in polymer. The lower the surface tension imparted to the hydrolysis solution by the catalyst acid the more favorable is the partition between more polar and less polar phases. A 2% solution of benzene sulfonic acid has a pH of 1.2 and surface tension of 51 dynes/cm. Hydrolysis at 90–95° C. of 30 grams of polyvinyl acetate using this solution occurs in 30 hours. On the other hand, the same result is obtained in only 6 to 8 hours using a 2% solution of dodecyl benzene sulfonic acid which has a surface tension of 32 dynes/cm. and a pH of 1.4. Preferred catalysts are those whose 2% or less aqueous solutions have pHs of less than 2.0 and surface tensions of less than 40 dynes per centimeter. Any alkyl aryl sulfonic acid, alkyl sulfonic acid, aryl phosphonic acid, alkyl aryl phosphonic acid, similar phosphinic acids or any other substances having these characteristics will effectively catalyze the hydrolysis of water-insoluble polymeric esters provided, of course, the catalyst is sufficiently soluble in the particular ester and is not decomposed under the conditions of the hydrolysis.

In addition to the effective catalysts described in the above examples the following compounds are useful in the process of this invention: octadecane sulfonic acid, tridecane sulfonic acid, benzene sulfonic acid, decyl benzene sulfonic acid, dioctylester of sulfosuccinic acid, tetrahydronaphthalene sulfonic acid, decyl benzene phosphinic acid, decyl benzene phosphonic acid, phenyl phosphinic acid, etc.

In general, the sulfonic, phosphinic and phosphonic acids, to be effective, must have within the molecule at least five carbon atoms. The alkali metal or alkaline earth metal salts of any of these acids may be used in combination with a still stronger organic or inorganic acid. Likewise, any derivatives of the acids, such as the lower aliphatic esters, which are readily convertible to the active acids may be employed advantageously.

The amount of acid catalyst is not critical. Satisfactory hydrolysis proceeds under the process of this invention with concentrations of as little as 0.025% of sodium dodecyl benzene sulfonate. Concentrations preferred are in the range of 0.1% to 2.0% of the catalysts, either in the acid or salt form. Larger amounts may be employed; however, since the reaction is catalytic, advantage of the effectiveness of small amounts is usually taken.

Likewise, the temperature is not critical. In most cases the hydrolysis of polyvinyl acetate in the presence of sulfuric acid and commercial sodium dodecyl benzene sulfonate is carried out at 90° C. to 100° C. This range is preferred, for in most cases rapid hydrolysis is attained at these temperature levels without injurious effect on the polymers. Lower temperatures, such as 0° C. to 90° C., may be employed, however, if desired. On the other hand, the rate of hydrolysis may be increased by employing higher temperatures, such as 100° C. to 150° C., obtainable by well-known methods. However, relatively complicated apparatus is required at these temperatures and the risk of degrading the various polymers is substantial. For most purposes, the temperature range of 90° C. to 100° C. is satisfactory.

The time of hydrolysis will, of course, vary with the degree of hydrolysis desired, the temperature, the concentration of the acids and the particular acids employed. In general, the reaction will be complete in 2 to 25 hours, although longer or shorter times can be used. As usually employed the hydrolysis reaction of this invention is continued until useful products are obtained, as, for example, water-soluble polyvinyl alcohols. Hydrolysis, however, may be terminated at any point prior to this, if desired. In the hydrolysis of cellulose acetate useful products are obtained by the process of this invention but these are only partially soluble in acetone, although the degree of substitution is correct for solubility in acetone. These partially acetone-soluble products are converted readily to acetone-soluble products by ripening in acetic acid, for example, in 90% acetic acid. This treatment does not change the degree of substitution.

While the invention has been described with particular reference to the hydrolysis of polyvinyl acetate and cellulose triacetate, other esters may be advantageously hydrolyzed by the process of this invention. For example, polyvinyl formate, mixed esters of cellulose, such as cellulose acetate propionate and cellulose acetate butyrate, starch acetate, and esters of polymeric acids such as polymethylacrylate may be hydrolyzed readily by the process of this invention. Interpolymers of vinyl acetate and other polymerizable monomers, such as ethylene/vinyl acetate and vinyl chloride/vinyl acetate copolymers, are also hydrolyzable by means of this invention. So also are copolymers of vinyl chloride and diethyl fumarate.

The acidic hydrolytic processes described above involve equilibrium reactions. Accordingly, the amount of ester groups remaining in the polyvinyl alcohol may be readily varied. For example, in the hydrolysis of polyvinyl acetate the degree of hydrolysis may be decreased by carrying out the reaction in the presence of added acetic acid, this acid being the acid produced during hydrolysis. A drop from 95% to 85% in the degree of hydrolysis occurs as can be seen by comparing Examples I and IV above.

In the hydrolysis of polyvinyl acetate by the process of this invention, the beads of the polymer actually grow in size in the initial stages of the reaction. As hydrolysis occurs, the number of hydroxyl groups on the chain increases with attendant water-solubility. In this acidic hydrolysis, the following steps are postulated:

1. Ionization of the acid catalyst occurs according to the equilibrium: $H+A^-\rightleftharpoons HA$, where $A^-$ is an anion of the higher molecular weight phosphinic, phosphonic or sulfonic acid, $H^+$ represents a hydrogen ion and HA is the catalyst in molecular form.

2. Molecules of water and acid catalyst, HA, dissolve in the polyvinyl acetate with resultant swelling of the polymer beads and reduction of the pH within them.

3. Ionization of these molecules occurs within the polymer bead and hydrolysis proceeds to equilibrium.

$$HA \rightleftharpoons H^+ + A^-$$

Polyvinylacetate+H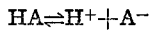₂O

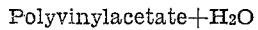

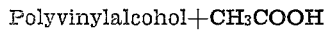

Polyvinylalcohol+CH₃COOH

4. Finally, the bead disappears when hydrolysis has produced a polymer soluble in the reaction medium.

From the above postulates it is apparent that the catalyst must be reasonably soluble in the polyvinyl acetate and, also it must be a strong acid in order to promote hydrolysis. However, it is desirable that the catalyst be not completely ionized, for, as pointed out above, the water-insoluble polymeric esters are not readily permeated by ions. In this respect, the chief function of added strong organic or mineral acid, such as oxalic acid or sulfuric acid, is to increase the concentration of HA, molecules of the particular catalyst used, thereby effecting an increase in the concentration of these molecules within the polymer beads. Any substantially completely ionized acid, which may be an organic or a mineral acid, may be used for these purposes. In most instances, the catalysts of this invention are effective in the absence of these acids. For example, at catalyst concentrations of about one to two percent the addition of mineral or other strong acid has very little effect, whereas at low concentrations of the catalyst acid (about 0.02%, for example) the rate of reaction is markedly increased. Accordingly, it is economically advisable to use added mineral or other strong acids. The most effective catalysts are relatively slightly soluble in water, solution in the ester being thereby favored. Catalysts having these requirements have been found only among those compounds having an effect on the surface tension of the media, whereby the desired surface tension of less than 60 dynes per centimeter results. It has been found that at a pH of 2 or less and at a surface tension of 60 dynes per centimeter or less effective concentrations of catalyst molecules, HA, within the polymer beads are obtained.

Hydrolysis does not occur at an appreciable rate if mineral acids are used alone. For example, after heating polyvinyl acetate with 2% hydrochloric acid for 56 hours with stirring little or no change occurred in the polymer beads and a homogeneous solution of polyvinyl alcohol was not obtained. Likewise, sulfuric acid alone did not promote hydrolysis at a reasonable rate. This is true also of the auxiliary organic acids, such as oxalic acid, which do not have the requisite solubility.

The catalysts to be effective must be resistant to aqueous hydrolysis. For example, when 30 parts of polyvinyl acetate, 100 parts of water and 2 parts of 2-ethylhexyl sulfuric acid ester were heated with stirring at 90° C. to 95° C. for 48 hours, no change in the polymer beads was noted. The catalyst employed was not sufficiently stable and was completely hydrolyzed before it had penetrated the polymer structure sufficiently to catalyze the hydrolysis of the polymeric ester. Sulfuric acid esters of aliphatic alcohols, although they are strong acids and are soluble in the polyvinyl acetate, are ineffective because of their rapid decomposition in water.

As is described in Blume copending application, Serial No. 772,458, in acidic media anionic catalysts are needed, cationic catalysts being ineffective. For example, no hydrolysis occurs when a cationic catalyst, such as cetyldimethyl benzyl ammonium chloride (1 part), is used in the hydrolysis of polyvinyl acetate (60 parts) carried out in water (100 parts) containing concentrated sulfuric acid (1 part), the temperature being 90° C. to 95° C. for 120 hours. In dyeing experiments it was shown that in acid solution only a dye having a colored anion was absorbed by the polymer, whereas, in basic solution only a dye having a colored cation was taken up by the polymer. It was also found that the acid hydrolysis could be catalyzed by the use of an anionic dye, sodium hydroxy azobenzene sulfonate (commercially known as Orange II) in the presence of sulfuric acid.

This particular agent has too little effect on the surface tension of water to be classed as a wetting agent. For example, 1% aqueous solutions of Orange II have surface tensions of about 50 dynes per centimeter, whereas, a 1% aqueous solution of Nacconol, a typical wetting agent, has a surface tension of about 33 dynes per centimeter. Similarly, benzene phosphonic acid, an effective catalyst in the process of this invention, can not be classed as a wetting agent, its 1% aqueous solution being characterized by a surface tension of 50 dynes per centimeter. Thus, while certain of the effective catalysts of this invention, such as dodecyl benzene sulfonic acid, do have wetting action, this characteristic is not required.

Hitherto, formation of an emulsion has been considered to be an essential part of the hydrolysis of esters, such as glycerides or polyvinyl esters. Hydrolysis at a reasonable rate was thought impossible in the absence of wetting agents and their action. Accordingly, solvents were used and the medium was specially prepared so that the ester being hydrolyzed was present in a dispersed liquid phase. In this invention, the ester is present in a solid phase. It is not necessary in the process of this invention to prepare special emulsions nor to recover solvents to make the process economically feasible. No solvents need be used in the process of this invention and recovery steps are limited to the reclamation of the acid freed from the polymeric ester in the hydrolysis.

In this respect the process of this invention has outstanding advantages over previously known acidic hydrolysis methods. As pointed out above, aqueous hydrolysis of polyvinyl acetate in its acetic acid solutions requires recovery of about 9 to 10 pounds of acetic acid per pound of polyvinyl alcohol produced. Similar hydrolysis of cellulose acetate requires recovery of about 6.5 pounds of acetic acid per pound of cellulose acetate. These polymers may be hydrolyzed efficiently and to the same degree as formerly by the process of this invention. Further, only about 1.35 pounds of acetic acid per pound of polyvinyl alcohol and only 0.9 pound of acetic acid per pound of cellulose acetate produced require recovery. Considerable economic advantage of the process of this invention is apparent from a comparison of these figures to the respective figures given for the old processes.

The process of this invention may be used advantageously in the hydrolysis of any water-insoluble polymeric ester. Unlike prior processes, excessive amounts of acid or solvent are not consumed. There are no problematical recovery steps. No solvents are used and recovery steps are, therefore, minimized. Further, the acid obtained from the polymeric ester is recovered readily as the free acid, formation of troublesome esters being avoided. The efficiency of the catalysts permits their use in small, inexpensive amounts and also the completion of hydrolysis in relatively short periods of time. The products of this invention may be used in the film and fiber form and, in general, wherever the polymers, for example, polyvinyl alcohol and cellulose acetate, find application.

Any departure from the above description which conforms to the present invention is intended to be included within the scope of the claims.

I claim:

1. A process for the heterogeneous hydrolysis of a water-insoluble, polymeric organic ester in an aqueous medium which comprises forming a heterogeneous mixture comprising said ester selected from the group consisting of a polyvinyl acetate and a cellulose acetate, water, sulfuric acid and dodecyl benzene sulfonic acid, said mixture having a pH of no more than 2 and a surface tension of no more than 60 dynes per centimeter; and hydrolyzing said ester by treating it with said acids.

2. A process in accordance with claim 1 in which said ester is a cellulose acetate.

3. A process in accordance with claim 1 in which said ester is a polyvinyl acetate.

4. A process for the heterogeneous hydrolysis of cellulose acetate which comprises placing said acetate in water containing sulfuric acid and 0.1% to 2% of dodecyl benzene sulfonic acid and heating the resultant heterogeneous mixture at a temperature of 90° C. to 95° C., thereby hydrolyzing said cellulose acetate.

5. A process for the heterogeneous hydrolysis of a water-insoluble, polymeric organic ester which comprises forming a heterogeneous mixture comprising a cellulose acetate, water and a strong acid selected from the group consisting of sulfonic, phosphinic and phosphonic acids, said acid containing at least five carbon atoms, being appreciably soluble in said ester and forming with said water an aqueous media having a pH of no more than 2 and a surface tension of no more than 60 dynes per centimeter; and hydrolyzing said ester in said heterogeneous mixture by treating it with said aqueous media.

6. A process in accordance with claim 5 in which said mixture contains in addition to said strong acid a substantially completely ionized acid.

7. A process in accordance with claim 5 in which the said mixture contains 0.1% to 2% of said strong acid.

8. A process in accordance with claim 5 in which the said mixture contains 0.1% to 2% of said strong acid and the temperature is from 90° C. to 100° C.

9. A process for the heterogeneous hydrolysis of a water-insoluble, polymeric organic ester which comprises forming a heterogeneous mixture comprising a cellulose acetate, water and a strong sulfonic acid, said acid containing at least five carbon atoms, being appreciably soluble in said ester and forming with said water an aqueous media having a pH of no more than 2 and a surface tension of no more than 60 dynes per centimeter; and hydrolyzing said ester in said heterogeneous mixture by treating it with said aqueous media.

10. A process in accordance with claim 9 in which said mixture contains in addition to said sulfonic acid a substantially completely ionized acid.

11. A process in accordance with claim 9 in which the said mixture contains 0.1% to 2% of said sulfonic acid.

12. A process in accordance with claim 9 in which the said mixture contains 0.1% to 2% of said sulfonic acid and the temperature is from 90° C. to 100° C.

MAX T. GOEBEL.

REFERENCES CITED

The following references are of record in the file of this patent:

UNITED STATES PATENTS

| Number | Name | Date |
|---|---|---|
| 1,878,953 | Malm | Sept. 20, 1932 |
| 2,333,804 | Malm et al. | Nov. 9, 1943 |
| 2,386,347 | Roland | Oct. 9, 1945 |
| 2,403,004 | Kenyon | July 2, 1946 |

FOREIGN PATENTS

| Number | Country | Date |
|---|---|---|
| 528,741 | Germany | July 15, 1931 |
| 776,019 | France | Jan. 15, 1935 |
| 483,223 | Great Britain | Apr. 8, 1938 |
| 577,963 | Great Britain | June 6, 1946 |